Sept. 2, 1941.     A. F. ARCIER ET AL     2,254,260
AIRCRAFT LANDING GEAR
Filed March 30, 1939     4 Sheets-Sheet 3

INVENTOR
Alex Francis Arcier
BY Max P. Baker
Marechal & Noi
ATTORNEY

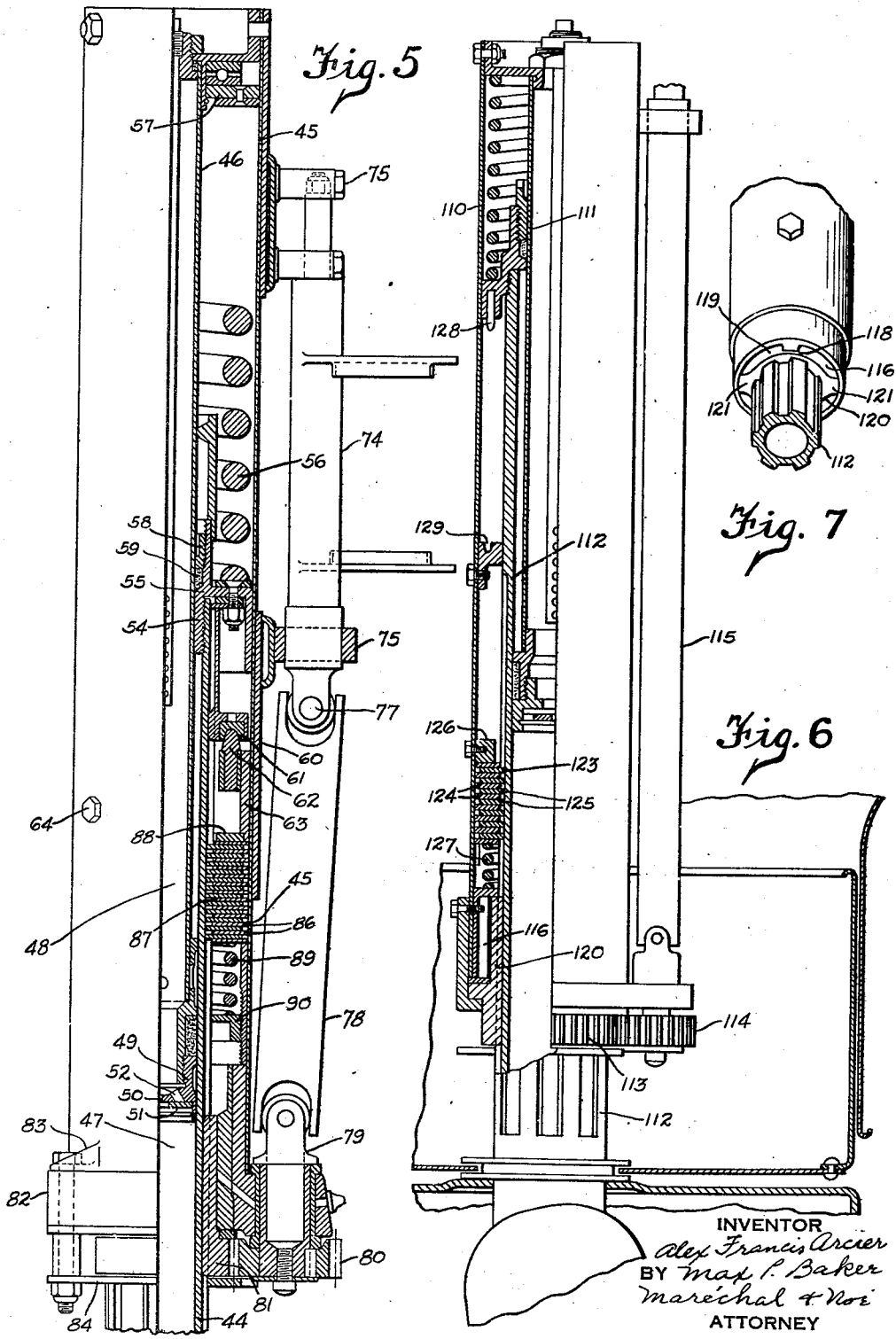

Patented Sept. 2, 1941

2,254,260

UNITED STATES PATENT OFFICE 2,254,260

AIRCRAFT LANDING GEAR

Alex Francis Arcier and Max P. Baker, Dayton, Ohio, assignors to The Waco Aircraft Company, Troy, Ohio, a corporation of Ohio Application March 30, 1939, Serial No. 264,894

7 Claims. (Cl. 244—103)

This invention relates to aircraft and more particularly to aircraft landing gear.

One object of the invention is the provision of an aircraft landing gear embodying a landing wheel of the castering type and control mechanism therefor arranged to insure freedom of movement of the castering wheel through a wide angle.

Another object of the invention is the provision of a landing gear of the character mentioned, in which the control mechanism is so arranged that it can positively move the landing wheel to a limited extent towards its normal position from a position in which the wheel is turned through a wide angle.

Another object of the invention is the provision of an aircraft having a landing gear embodying a forward castering wheel having means for effectively preventing shimmy vibrations of different rates of vibration.

Another object of the invention is the provision of an aircraft having a castering wheel which has a freedom of castering movements through a wide angle, and in which friction means and liquid damping means are provided to effectively prevent shimmy vibrations of the wheel.

Another object of the invention is the provision of an aircraft landing wheel of the castering type, adapted for shock absorbing movements in an upward direction with respect to the aircraft, and having a control mechanism including an operating shaft arranged behind the housing or casing with which the movable part of the wheel support is telescopically engaged.

Another object of the invention is the provision, in an aircraft landing gear of the character mentioned, of streamlining members, telescopically related, and partially streamlining the wheel as well as the movable upper portions of the wheel support.

Other objects and advantages of the invention will be apparent from the following description, the appended claims and the accompanying drawings, in which:

Fig. 5 is a side elevation, partly in vertical section, showing the shock absorbing mechanism of the forward landing wheel;

Fig. 6 is a view similar to Fig. 5 but illustrating a modified form of construction;

Fig. 7 is a perspective detail view of a portion of the mechanism shown in Fig. 6; and Fig. 8 is a diagrammatic view showing the operation of the landing gear.

Figure 1:
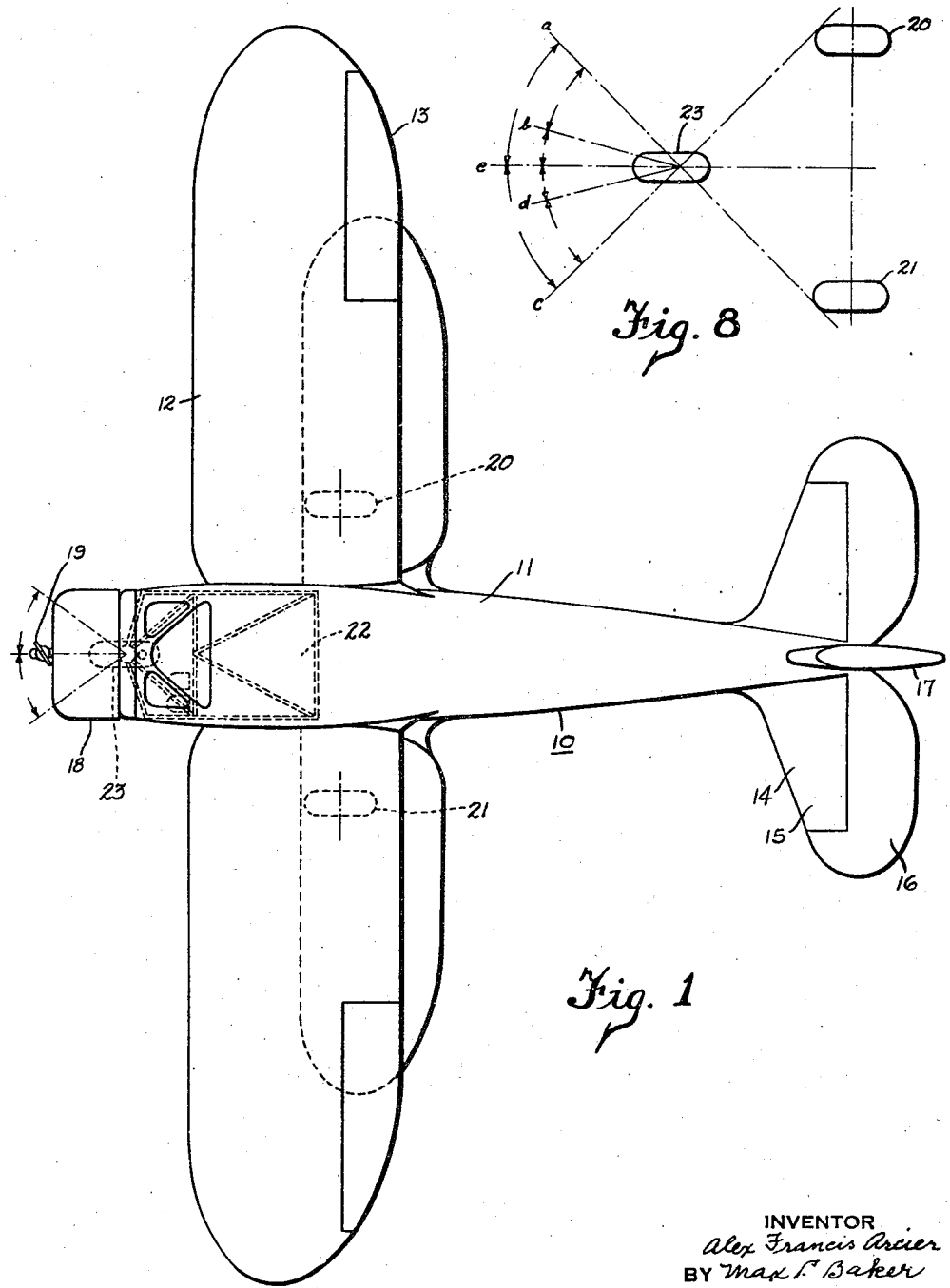
Fig. 1 is a top plan view of an airplane embodying the present invention.

Referring more particularly to the drawings by reference numerals, 10 generally designates an aircraft, herein shown as an airplane including a fuselage 11, sustaining surfaces 12 provided with ailerons 13, and an empennage 14. The latter includes a fixed stabilizing surface 15, a horizontal rudder 16 and a vertical rudder 17. A suitable engine is provided within the engine cowling 18 for operating the propeller 19.

The airplane is supported, while on the ground, by means of a pair of main landing wheels 20 and 21 preferably spaced rather widely apart and arranged somewhat to the rear of the center of gravity which is indicated at 22 of the airplane. Some distance in front of the center of gravity is a forward landing wheel 23.

Figure 2:
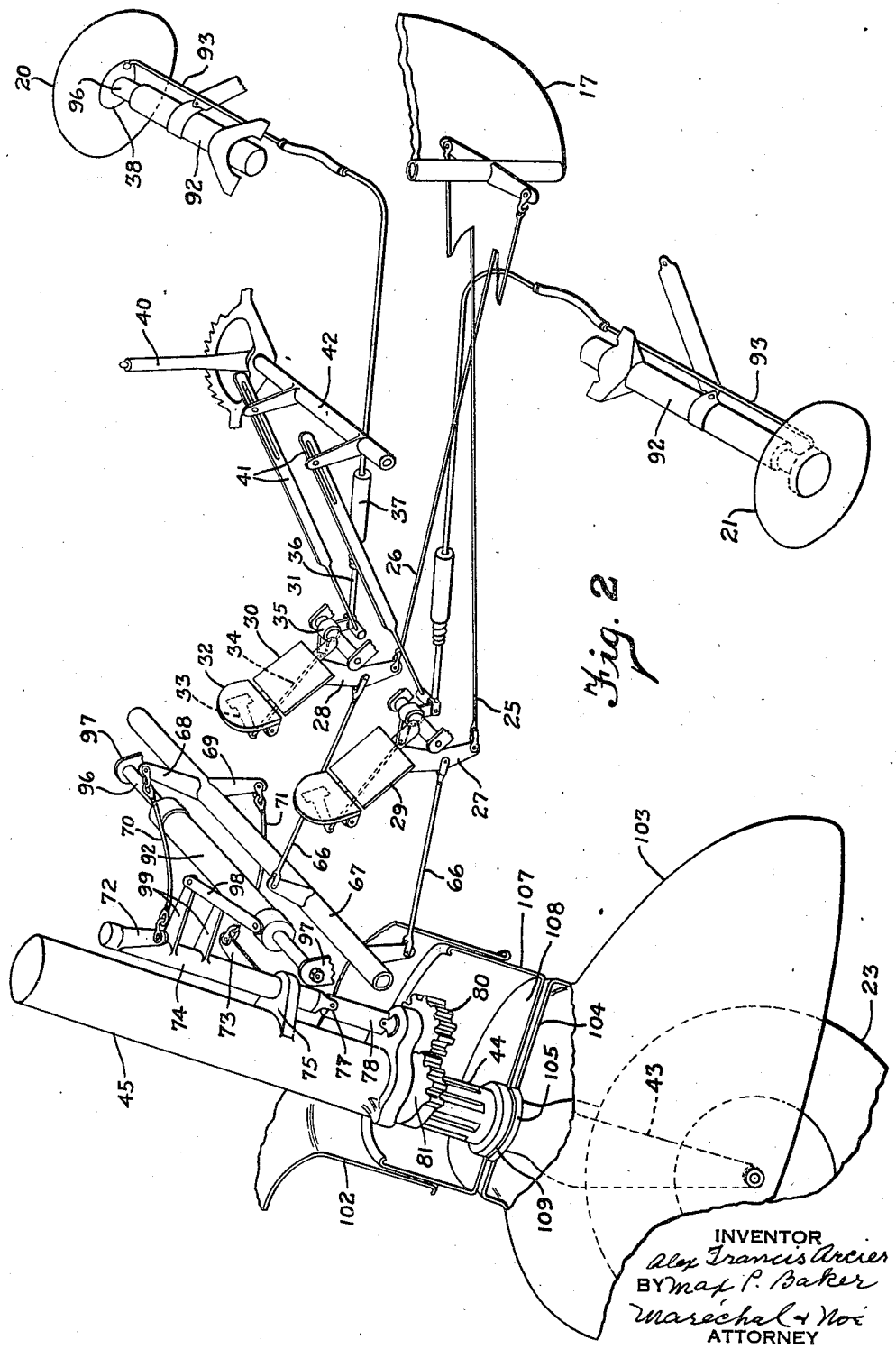
Fig. 2 is a perspective view showing the castering wheel and its control mechanism.

The vertical rudder 17 is controlled, as shown in Fig. 2, by means of control rods or cables 25 and 26 connected to control horns 27 and 28 which are rigid with the operating pedals 29 and 30 respectively. These pedals are mounted for movement about horizontal axes on supports 31 which are carried in any suitable manner by the fuselage structure. Linked to the upper portion of each of the pedals 29 and 30 is a toe portion 32 which has a horn or arm 33 fixed thereto connected by means of the link 34 to a bell crank lever 35 which is pivotally mounted on the pedal support and which is connected by means of the operating rod 36 to the piston of a fluid pressure cylinder 37 so that when the toe portion 32 is depressed the rod 36 will be moved rearwardly and pressure will be applied to the brake 38 of the wheel 20 when the right-hand toe portion is operated, the brake of the left-hand wheel 21 being applied when the left hand toe portion is depressed. The brakes of the wheels are also applied to some extent when the pedals 29 or 30 are greatly depressed without tilting the toe portions on the pedals, although in order to obtain full braking effect the toe portion of the pedal must be moved forwardly with respect to the pedal on which it is carried.

To apply both brakes continuously such as for parking the brake operating bell crank levers 35 are connected to a hand lever 40 by means of slotted links 41 and a rock shaft 42, the slots in the links permitting free pedal control when the lever 40 is positioned as shown in Fig. 2.

The ailerons or lateral control devices and the horizontal rudder are controlled in any suitable or customary manner by an additional control member or members, not shown.

The forward landing wheel 23 as shown in Fig. 5 is of the shock absorbing type. The wheel is rotatably mounted and carried by a fork 43 provided on the lower end of a splined post 44. This post is arranged for telescopic movement with respect to a housing or strut 45 which is mounted on the fuselage in fixed position unless the wheel 23 is intended to be swung upwardly into a retracted and fully housed position in the fuselage. The housing 45 inclines downwardly and forwardly at a suitable angle and has a tubular housing portion 46 arranged with the upper portion of the post 44, these two parts being relatively slidable one on the other. The post 44, being hollow, forms an oil or liquid chamber 47 in communication with the chamber 48 provided by the housing portion 46. On the lower end of the housing portion 46 is a valve seat 49 which has a central restricted orifice 50 of such character as to limit the rate of upward flow of oil or liquid from the chamber 47 into the chamber 48, which occurs when the post 44 is moved upwardly by engagement of the wheel with the ground upon landing. Engaging the valve seat 49 is a valve member 51 of such character as to close a rather large passage or passages 52 when the post 44 moves upwardly, but permitting rapid and rather free communication between the chambers 48 and 47 around the valve member when the post 44 is moving downwardly with respect to the upper housing portion.

Fixed to an upper portion of the post 44 and preferably threaded thereon as indicated at 54 is an abutment member 55 engaging the lower side of a coil spring 56 the upper end of which is adapted to engage the upper wall 57 of the housing in case of heavy shocks occurring in landing and for support when taxiing and at rest. Threaded on the abutment member 55 is a packing gland 58 holding packing 59 in place.

The lower portion 60 of the abutment member 55 is provided with one or more conical or tapered recesses 61 which are engaged by a corresponding number of locating pins 62 carried by a pin supporting member 63 which is connected by a bolt or bolts 64 to the outer cylindrical shell or housing 45. The pins 62 are only engaged by socket 61, however, when the landing wheel 23 is in its lowermost position, when the aircraft is in flight, the location of the sockets and pins being such that the wheel 23 will be maintained in its normal or forwardly directed position during flight. As the aircraft leaves the ground, the plane of rotation of the wheel will be in line with the longitudinal axis of the aircraft, so that the pins will enter the sockets as the landing wheel 23 lowers. This will hold the wheel 23 during flight so that when the air plane lands, the landing wheel will be in its normal position although practically instantly the landing wheel 23 will rise with respect to the housing 45 and the sockets 61 will be freed from the pins to permit castering movements of the wheel, as will be presently described.

The forward wheel 23 is of the castering type, the axis of inclination of the post 45 being such that the center of the wheel tread on the ground is some distance to the rear of the point of intersection of the longitudinal axis of the shock absorber with the ground. The wheel will thus turn itself to align its plane of rotation with the direction of travel of the aircraft along the ground, and since the main landing wheels 20 and 21 are arranged to the rear of the center of gravity, the aircraft, which may be flying in a cross wind, will quickly turn itself, as it lands, so that the longitudinal axis of the aircraft is aligned with its direction of movement along the ground. Some considerable degree of freedom of movement of the castering wheel in its castering movements is permitted although in order to permit the pilot to bring the wheel 23 from a position widely displaced from normal back to some extent towards a normal position there is a manual control connection between the supporting post 44 and control mechanism operated by the pilot. This will enable him to rather rapidly turn the ship towards the right, for example, in starting to taxi along the ground, even if the airplane has stopped with the front landing wheel pointed at a wide angle towards the left and there may be some obstruction in the path of the airplane preventing further movements towards the left. The same condition may apply where a pilot wants to turn towards the left, in starting to taxi, and the landing wheel 23 may be pointing towards the right and at a very wide angle from its normal position. There is, however, a considerable degree of lost motion between the manually operated controls and the rotatable post so that the free castering movements of the wheel 23 through a wide angle cannot be interfered with by the pilot.

Figure 3:
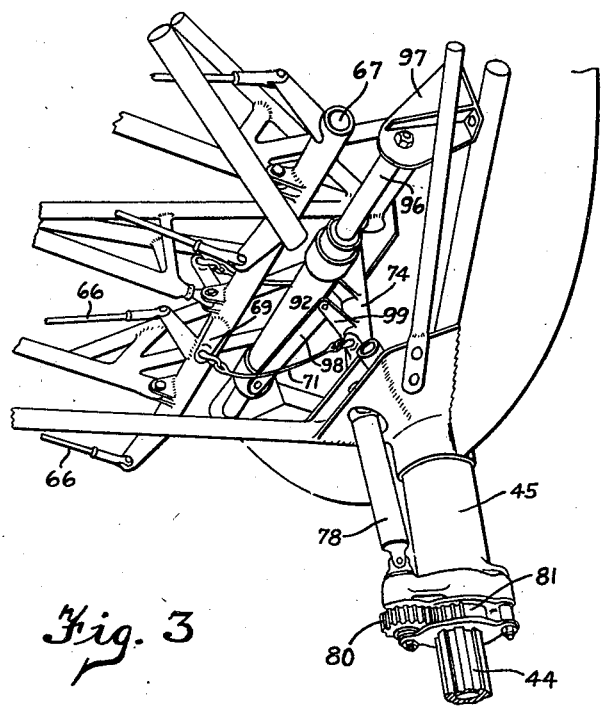
Fig. 3 is a perspective view looking upwardly at the operating mechanism which controls the castering wheel.

As shown more particularly in Figs. 2, 3 and 5, the control horns 27 and 28 of the two foot pedals are connected by operating rods or links 66 to a rock shaft 67 which is provided with control horns 68 and 69. These control horns are connected by flexible slack cables 70 and 71 respectively to two control horns 72 and 73 on a shaft 74 which is arranged to the rear of and rather close to the housing 45 of the shock absorbing wheel support. Shaft 74 is rotatably mounted in bearing members 75, which are clamped or welded securely on the cylindrical housing 45. The lower end of the shaft 74 is connected by a suitable universal joint 77 to a shaft 78 and the lower end of the latter is connected to a short shaft portion 79 which is fixed to a pinion 80. This pinion meshes with a gear segment 81 which is splined to the post 44. A fixed bearing member 82, connected by bolts to brackets 83 carried by the lower part of the housing 45, and a plate 84 arranged on the lower side of the gear and segment maintain these parts against relative axial movement in the stationary part of the shock absorbing mechanism.

The control mechanism for the shock absorbing wheel is such that when the right-hand pedal 30 is depressed the cable 70 is first tightened to take up the lost motion that exists between the pedals and the wheel, and the horn 72 is then moved rearwardly as the operation of pedal 30 continues so as to turn the pinion 80 and rotate the landing wheel if the wheel 23 is in a widely displaced position pointing towards the left. The wheel will thus be moved back to some extent towards its normal position, and a similar movement but in an opposite sense will take place when the left-hand pedal 29 is depressed. However there is sufficient slack in the cables 70 and 71 so that it is impossible for the pilot to return the wheels all the way back to a normal position. This makes it impossible for the pilot to positively increase the angle of turn of the wheel, or to interfere with the wide range of free castering movements of the wheel in case a control is operated improperly at the time of landing. The wheel 23 is preferably capable of moving through a total angle of about 90°, as will be seen in Fig. 8, so that the aircraft can be turned approximately upon either the right or left hand rear wheel. The manual control is such as to return the wheel from a widely displaced angle indicated by the line $a$ in Fig. 8 back to the angle indicated by the line $b$ or to return the wheel from $c$ to $d$, but the angle included between the lines $d$ and $b$, where free castering movements of the wheel are always permitted, is a wide angle extending a quite considerable distance to opposite sides of the normal position $e$. This angle in which free castering movements of the wheel cannot be manually interfered with is preferably an angle of the order of 30° or in other words about 15° to each side of normal, although this depends of course upon the triangular relationship of the three wheels and the maximum degree of castering movements that would be likely to be required under the most adverse conditions in landing.

Figure 4:
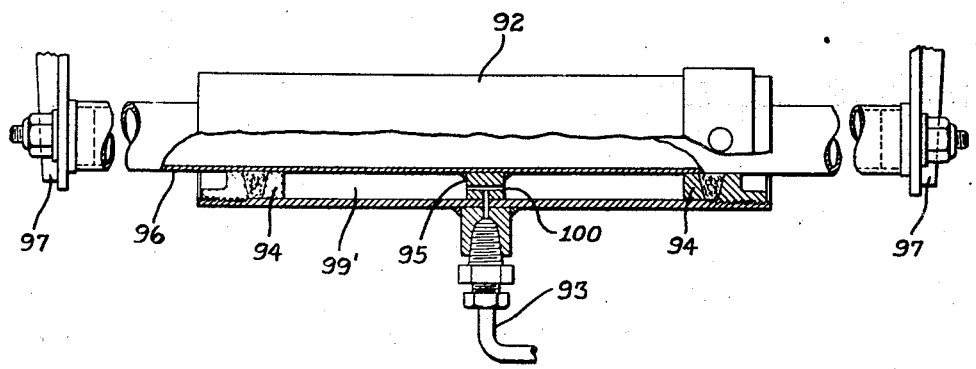
Fig. 4 is a detail view, partly in section, showing the shimmy resisting liquid damping means.

Freely castering wheels in an aircraft in which there is a forward castering wheel and two main landing wheels arranged to the rear of the center of gravity are subjected to many various conditions producing shimmy or oscillatory angular vibrations of the wheel from side to side either at a very rapid rate or sometimes at a rather slow rate of vibration. And such shimmy vibration is exceedingly dangerous and destructive, dangerous because it occurs at the very moment of landing, and of rapid taxiing immediately after landing, and destructive because of the violent vibration it imparts to the aircraft and its various parts. In accordance with the present invention however such shimmy movements of the castering wheel are effectively prevented and are either eliminated entirely or are reduced to such small amplitude as to be substantially unnoticeable. As shown in Figs. 3, 4 and 5, a series of stationary fixed disks 86, held against rotation in the housing 45, cooperate with a series of rotatably operable friction disks 87 which turn with the post 44. The disks 86 have peripheral portions which are splined or keyed to the housing 45, while the movable disks 87 are provided with openings which fit in the splinder portion of the post 44. The upper friction disk of the series engages against a stationary abutment plate 88, and the lower friction disk is yieldingly pressed upwardly so as to hold the various friction disks together under yielding pressure, by means of a coil spring 89 the lower end of which engages an adjustable abutment 90 which is threaded in the lower portion of the housing 45. The position of the abutment 90 may be changed by screwing it further into or out of the housing in order to adjust the pressure of the spring 89, the abutment 90 being so arranged as to give a frictional restraining force, in opposition to shimmy vibrations of the wheel, of the order of about 50 foot pounds so as not to create such a large restraining force on the post 45 as to render the manual operation of the wheel exceedingly difficult, and in order not to create such a high restraining force as to seriously interfere with the free castering movements of the wheel itself. However the amount of restraining force produced by the friction disks is a very substantial one and is effective in substantially eliminating comparatively low speed shimmy vibrations and in preventing shimmy vibrations from building up. It is preferred that the amount of restraining force produced by the friction disks should be less than the total restraining force required under all conditions to eliminate shimmy vibrations of the wheel, and additional means are provided which supplement the action of the friction disks, in effectively eliminating all objectionable or destructive shimmy vibrations. This additional means comprises a liquid damping device which is illustrated in Fig. 4, and which comprises a fluid pressure cylinder 92 connected by means of a suitable connection 93 to a source of oil or other damping liquid and having a check valve preventing return flow. Opposite ends of this cylinder 92 are closed by means of end walls 94 provided on the cylinder and at opposite sides of a piston 95 which is fixed to the tube 96. Opposite ends of the tube 96 are secured in fixed position to a suitable supporting frame 97. The piston 95 is thus held stationary, while the cylinder is connected by means of links 98 to the horns 99 on the shaft 74. Turning movements of the shaft 74 are thus resisted by the liquid in the chamber 99′, the liquid being forced to flow from one side of the piston to another through a restricted passage 100, providing a suitable restriction to the flow such that the shaft 74 can be turned either by the pilot or by the action of the castering wheel itself at a sufficiently rapid rate to provide for proper castering operation or proper control operation by the pilot, although rapid oscillatory movements of the shaft 74 are restrained to such an extent as to very effectively prevent violent or wide rapid swinging movements of the shaft. Any high speed shimmy tendency is thus effectively prevented by the combined action of the friction disks and the fluid pressure mechanism, and any wide angle shimmy even if at a comparatively slow rate is prevented by the fluid pressure device, which is effective in producing several times the resistance to violent or wide vibrations as compared with the resistance produced by the friction disks.

The location of the shafts 74 and 78 immediately to the rear of the inclined shock absorbing housing 45 permits these parts to be streamlined together within fairing 102, which also encloses and streamlines the pinion 80 and the gear segment 81 as will be seen in Fig. 2. This fairing 102 is fixed to the lower portion of the fuselage and provides an enlarged rounded nose portion and a more tapering tail portion to reduce wind resistance as well as to protect the operating parts from dirt and dust. The upper part of the wheel is also streamlined by means of a streamlining cover or pant 103 the upper portion 104 of which is fixed to the flange 105 which is provided at the upper end of the wheel supporting fork 43. This pant or wheel cover 103 therefore turns with the wheel itself although both the wheel and the streamlining cover are held in their proper position during flight by means of the locating pins 62 and the sockets 61 of the shock absorbing mechanism.

The pant 103 may have its longitudinal plane of symmetry displaced slightly with respect to a plane coinciding with the plane of symmetry of the aircraft in order to arrange the streamlining of the wheel in the direction of the air currents past the same in case the propeller blast at this point is not directly rearwardly. Between the upper portion of the wheel cover and the stationary streamlined fairing 102 there is a streamlined cuff 107, telescopically slidable with respect to the fairing 102 and having a corresponding cross sectional shape so that when the wheel moves down from the position of the parts indicated in Figs. 2 and 5, the cuff 107 moves down with it, the height of the cuff being sufficient so that a streamlined enclosure will be maintained even when the wheel is in its lowermost position, during flight. The bottom of the streamlined cuff 107 is provided by a sheet metal wall 108 to which the peripheral portions of the cuff are fixed, and having a hole which is rotatably received in an annular groove 109 in the flange 105. This permits the fork 43 and the flange 105 to turn as in case of castering operation, while the cuff 107 is held against turning because of its non-circular cross sectional shape and its telescopic engagement with the fairing 102. The groove 109 receives the bottom wall 108 of the cuff and controls the up and down movements of the cuff but permits relative rotational movements of these parts.

In accordance with the construction already described the shimmy resistant liquid damping mechanism is provided externally of the housing 45, but, as shown in the modified form of construction illustrated in Fig. 6, the liquid damping device may be incorporated within the housing of the shock absorbing strut. As shown in Fig. 6, a portion being also illustrated in Fig. 7, the housing 110, corresponding generally to the housing 45, is provided with a housing portion 111 which is telescopically related to the upper portion of a splined post 112 on which the forward castering wheel is carried. The splined portion of the post operates in a gear segment 113 which is operated by a pinion 114 controlled and turned by the shaft 115, the latter being controlled and operated in the same manner as in the construction previously described. However in accordance with the construction shown in Fig. 6, the liquid damping cylinder and piston arrangement illustrated in Fig. 4 is omitted, and instead the housing 110 is provided with a chamber 116 extending annularly and concentric with the axis of the housing 110 and having a plurality of inwardly projecting stationary walls 118 arranged in close fitting relationship with respect to the cylindrical surface 119 of a movable member 120 which may form a part of or be secured to the gear 113. The movable member 120 is splined to the post 112 so that it must turn with it, and is provided with opposed outwardly projecting wall portions 121 which operate in close fitting relationship with respect to the inner cylindrical surface of the flange 116, the wall portions 121 being arranged between the walls 118. The chamber 119 is filled with oil or other suitable damping liquid, and the upper and lower end of the chamber are closed with a suitable means preventing the loss of liquid so that, as will now be apparent, shimmy vibrations causing rotational movements or oscillations of the wheel supporting post 112 will require the oil or damping liquid to flow past the clearance spaces between the parts 116 and 120, these clearance spaces being small enough so as to impart enough resistance to rapid or wide swing movements or violent oscillations to effectively prevent shimmy vibrations of this character. The friction disks 123 which are provided, add to the effect of the liquid damping means to prevent any objectional shimmy movements either at a high or low rate of speed, these frictional disks including stationary disks 124 splined to the housing 110 and cooperating friction disks 125 which are splined to the post 112, the friction disks being held between an adjustably fixed abutment 126 and the upper end of a spring 127. The shock absorbing mechanism is also provided with locating pins 128 cooperating with sockets 129 and provided respectively on the post 112 and on the housing 110 and engageable to hold the plane of rotation of the landing wheel in normal position when the airplane is in flight.

The control mechanism by which the various parts are manually controlled, and incorporating manually operable mechanism for returning the castering wheel part way towards normal position from a position in which the wheel is turned at a wide angle, and coordinated with the control for the rudder and for the brakes, provides a system which handles very much like the usual control system at present widely employed, and the controlled movements of the forward wheel are properly coordinated with the control of the rudder, full travel of the left hand pedal for example producing partial recovery from a full right turned position of the castering wheel while at the same time also operating the vertical rudder towards the left and differentially applying the brakes so that the left wheel will be held to form a turning pivot for the airplane. In such a construction the full range of movement of either pedal may take place at any time during flight without imposing the resistance of the operating or controlling parts connected directly to the castering wheel, since the castering wheel is then in its normal straight ahead position.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In an aircraft, a landing wheel, a post rotatably supporting said wheel, means rotatably supporting said post to provide for castering movement of the wheel to opposite sides of a normal position, and control means for rotating said post from a position displaced from normal, said control means having a lost motion connection to the post, the range of movement of the control means and the lost motion connection being such that the control means is effective to return the wheel only part way to the normal position and providing for free castering movements of the wheel in a range extending through a substantial angle to opposite sides of its normal position.

2. In an aircraft, a landing wheel, a post rotatably supporting said wheel, means rotatably supporting said post to provide for castering movement of the wheel, control means for rotating said post, said control means having a lost motion connection to the post such that the post is free of the control means when the wheel is in its normal position and regardless of the position of the control means, a rudder, and a positive connection between the rudder and said control means.

3. In an aircraft, a castering landing wheel, a post rotatably supporting said wheel at a point forward of the center of gravity of the aircraft, a casing in which said post is telescopically slidable, shock absorbing means in said casing, a shaft at the rear of said casing, gear means interconnecting said shaft to said post, control means, and a lost motion connection between said control means and said shaft such that the post is free to caster through a wide angle.

4. In an aircraft, a castering landing wheel, a post rotatably supporting said wheel at a point forward of the center of gravity of the aircraft, a casing in which said post is telescopically slidable, shock absorbing means in said casing, a shaft at the rear of said casing, gear means interconnecting said shaft to said post, fairing supported by said casing and enclosing said shaft and gear means, a stream-lined cuff carried by said post for relative rotational movement of the cuff and the post and telescopically related to said fairing, control means, and a lost motion connection between said control means and said shaft such that the post is free to caster through a wide angle.

5. In an aircraft, a landing wheel, a post rotatably supporting said wheel at a point forward of the center of gravity of the aircraft, a casing in which said post is telescopically slidable, shock absorbing means in said casing, a shaft at the rear of said casing, gear means interconnecting said shaft to said post, fairing supported by said casing and enclosing said shaft and gear means, a stream-lined cuff carried by said post for relative rotation of the cuff and the post and telescopically related to said fairing, and means for controlling said shaft.

6. In an aircraft, a landing wheel, a post rotatably supporting said wheel at a point forward of the center of gravity of the aircraft, a casing in which said post is telescopically slidable, shock absorbing means in said casing, a shaft at the rear of said casing, gear means interconnecting said shaft to said post, fairing supported by said casing and enclosing said shaft and gear means, a stream-lined cover for said wheel fixed to said post, a stream-lined cuff carried by said post and relatively rotatable thereon and in telescopic engagement with said fairing, and means for controlling said shaft.

7. In an aircraft, a castering wheel, a post rotatably supporting said wheel forward of the center of gravity of the aircraft, a casing on the aircraft receiving the post for telescopic axial movement therein and for rotational movement about the post axis, shock absorbing means in said casing opposing axial movement of the post in one direction, an oscillatable member within the casing in which the post is axially movable and is held against relative rotation, projections extending from said member, walls on said casing alternating with said projections, and closure members at the ends of said walls and projections and providing a closed fluid damping chamber in which said projections operate to oppose shimmy vibration of said wheel.

ALEX FRANCIS ARCIER.
MAX P. BAKER.